(12) United States Patent
Takubo et al.

(10) Patent No.: US 6,597,909 B1
(45) Date of Patent: *Jul. 22, 2003

(54) APPARATUS AND A METHOD FOR PERFORMING A CALL CONTROL IN A MOBILE COMMUNICATION SYSTEM

(75) Inventors: Hiroshi Takubo, Hiroshima (JP); Kenichiro Sakai, Kawasaki (JP)

(73) Assignee: Fijitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,027

(22) Filed: Jun. 28, 1999

(30) Foreign Application Priority Data

Sep. 10, 1998 (JP) .......................................... 10-256659

(51) Int. Cl.⁷ ................................................. H04Q 7/20
(52) U.S. Cl. ........................ 455/433; 455/412; 455/435
(58) Field of Search ................................ 455/432, 433, 455/412, 418, 422, 435, 8, 9, 67.1, 512, 514, 564

(56) References Cited

U.S. PATENT DOCUMENTS

| | | | | |
|---|---|---|---|---|
| 5,594,942 A | * | 1/1997 | Antic et al. | 455/433 |
| 5,903,627 A | * | 5/1999 | Shaffer et al. | 455/412 |
| 6,021,327 A | * | 2/2000 | Nguyen et al. | 455/433 |
| 6,078,811 A | * | 6/2000 | Lin et al. | 455/433 |

* cited by examiner

*Primary Examiner*—William Trost
*Assistant Examiner*—Simon Nguyen
(74) *Attorney, Agent, or Firm*—Katten Muchin Zavis Rosenman (57) ABSTRACT

An apparatus and a method for performing a call control in a mobile communication system including a home location register storing subscriber data for a home subscriber, a mobile switching center storage storing call connection information and a visitor location register for storing subscriber data for a roaming subscriber. The present invention determines in response to a service request signal that subscriber data is to be stored in the visitor location register and that there is no area therein for storing the subscriber data and based on the determining, retrieves the subscriber data from the home location register and stores the retrieved data in the mobile switching center storage area or overwrites the retrieved data in the visitor location register area.

16 Claims, 12 Drawing Sheets

Fig. 2

PRIOR ART

| Priority Value |
| --- |
| Subscriber Number |
| Registered Date |
| Number of Accesses |
| Accessed Date |

APPARATUS AND A METHOD FOR PERFORMING A CALL CONTROL IN A MOBILE COMMUNICATION SYSTEM

BACKGROUND OF THE INVENTION

1. Field of the Invention

The present invention relates to call controlling in a mobile communication system, particularly to an apparatus and a method for performing a call control in a mobile communication system, which can offer an optimum service economically and efficiently.

In a mobile communication system, a visitor location register is used to store subscriber data required for offering various services, including information on a location of a base station (or mobile switching center) in the coverage area of which a mobile station resides (hereinafter simply called mobile station location) and information for identifying the subscriber.

Accordingly, even when the storage capacity of the visitor location register is not sufficient enough, call controlling apparatus and method which can process various requests for services (e.g., location registration, call originating, call incoming) to/from a portable telephone are in great demand.

2. Description of the Related Art

Figure 1:
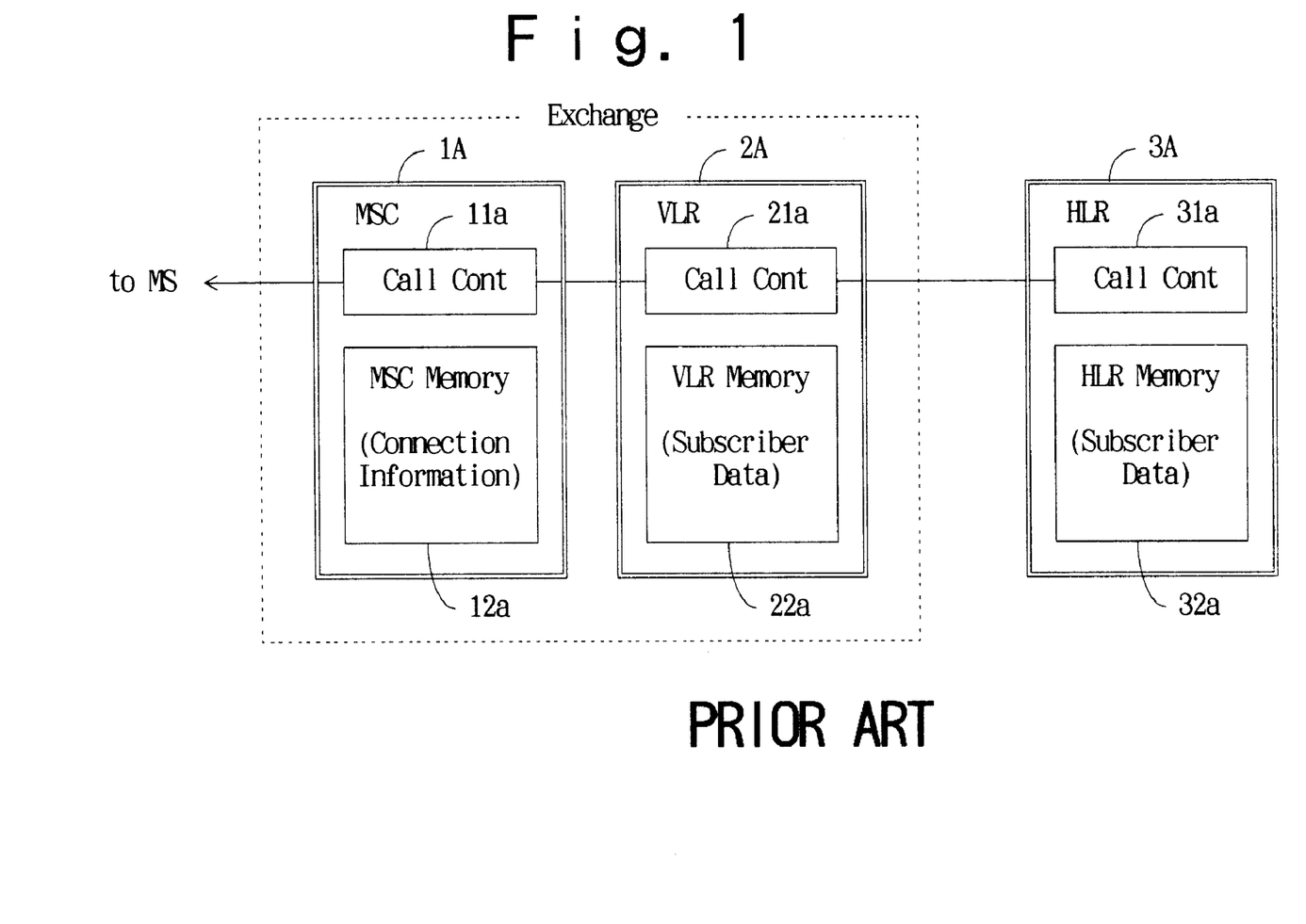
FIG. 1 is a block diagram showing principal devices of a conventional mobile communication system.

FIG. 1 is a block diagram showing principal devices of a conventional mobile communication system, in which an exchange is connected to a mobile station (abbreviated to MS) via a base station (not shown). The mobile station is a telephone which changes from location to location, such as a car telephone and a portable telephone.

exchange, which is comprised of a mobile switching center (abbreviated to MSC) 1A and a visitor location register (abbreviated to VLR) 2A, conducts a location registration for the mobile station on receiving a location registration request signal therefrom. It also establishes a connection between mobile stations by sending a call incoming request signal to a called mobile station on receiving a call originating request signal from a calling mobile station.

The MSC 1A is comprised of a call controller (abbreviated to Call Cont in the figure) 11a and an MISC memory 12a. The MSC memory 12a has areas called call connection information areas (abbreviated to CIA in the figure) for a predetermined number of subscribers. The area stores therein call connection information required to connect a call, including the information on a base station, connection path, billing and routing. The call controller 11a controls so as to connect the call based on the information stored in the MSC memory 12a.

The VLR 2A is comprised of a call controller (abbreviated to Call Cont in the figure) 21a and a VLR memory 22a. The VLR memory 22a has a subscriber data area for storing roaming subscriber's information, including the mobile station location, subscriber identifier (e.g., telephone number, telephone set number), authentication, restriction indicator, supplementary service and network identity, for a predetermined number of subscribers. The call controller 21a manages the subscriber data of a roaming subscriber in the VLR memory 22a.

A home location register (hereinafter called HLR) 3A is composed of a call controller 31a and an HLR memory 32a. The HLR memory 32a stores therein subscriber data for home subscribers, including the mobile station location, subscriber identifier (e.g., telephone number, telephone set number), authentication, restriction indicator, supplementary service. A call controller 31a manages subscriber data of the home subscribers in the HLR memory 32a.

When the location registration request signal for a mobile station is received from the MSC 1A, the VLR 2A obtains a subscriber data area (abbreviated to SDA in the figure) for storing the subscriber data in the VLR memory 22a. Then, it retrieves the subscriber data from the HLR 3A and stores and holds the retrieved subscriber data in the area while the mobile station resides in the network concerned. When receiving a call originating request signal from a mobile station or when sending a call incoming request signal to a mobile station, the VLR 2A reads the subscriber data from the area to perform a call connection.

Figure 2:
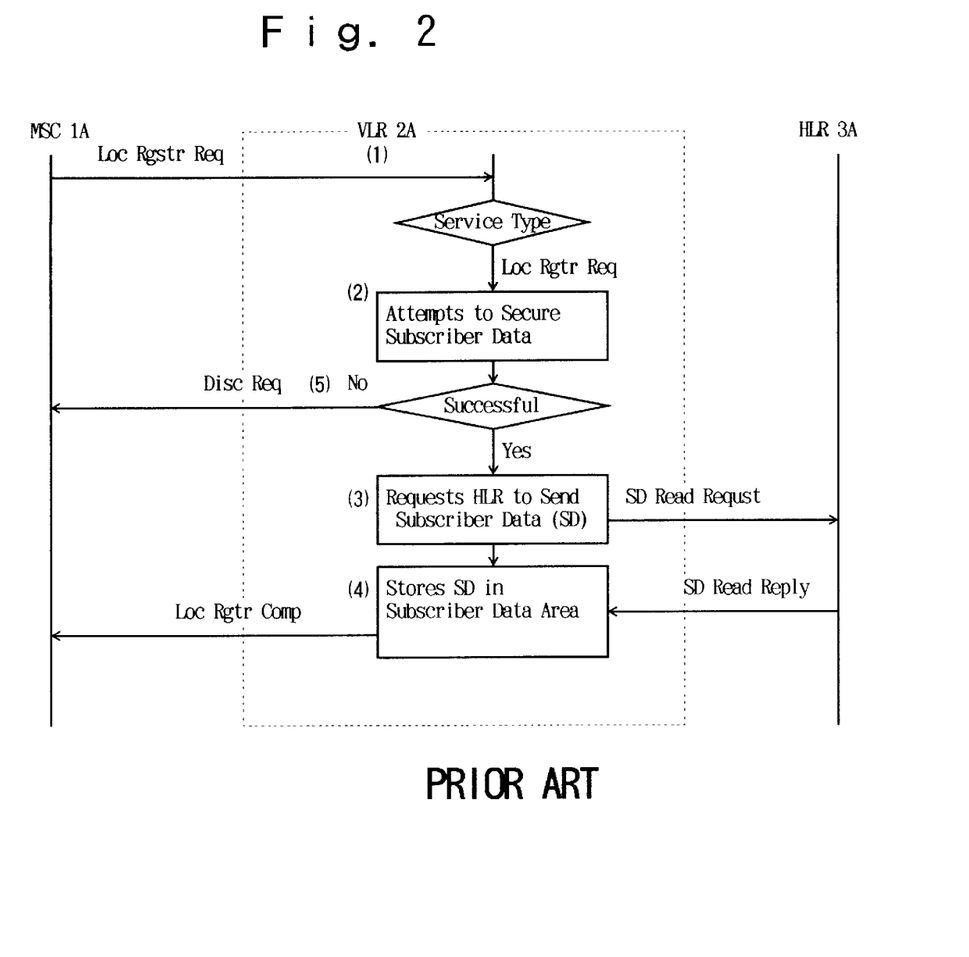
FIG. 2 is a flowchart illustrating a conventional location registration.

FIG. 2 is a flowchart illustrating a conventional location registration, which is performed by the VLR 2A.

(1) When receiving from a mobile station (MS) a location registration request signal including the mobile station location information, the MSC 1A requests the VLR 2A to register the location.

(2) The VLR 2A attempts to obtain the subscriber data area in the VLR memory 22a.

(3) When the attempt is successful, the VLR 2A requests the HLR 3A to reply with the subscriber data of the mobile station.

(4) The VLR 2A stores the replied subscriber data in the obtained subscriber data area and thereafter, informs the MSC 1A of completion of the location registration (hereinafter, the operation of steps (3) and (4) is called normal processing of the location registration).

(5) If the attempt in step (2) is unsuccessful, the VLR 2A indicates the MSC 1A to disconnect the call.

According to the conventional method as described above, it was a problem that when there was no subscriber data area left in the VLR memory 22a, the VLR 2A had to reject all the service requests for location registration, call originating, call incoming, etc., from/to a roaming subscriber.

It was another problem that increasing the storage capacity of the VLR memory 22a to overcome the above problem increases the cost of the VLR 2A and therefore the cost of the system.

SUMMARY OF THE INVENTION

It is an object of the present invention to provide an apparatus and a method for performing a call control in a mobile communication system, which can offer an optimum service to the mobile station efficiently without rejecting the service requests from/to a roaming subscriber.

It is another object of the present invention to provide an apparatus and a method for performing a call control in a mobile communication system, which can offer an optimum service economically with a small amount of storage capacity of the visitor location register memory.

To achieve the above and other objects, the present invention provides determination means and storing means. In an apparatus for performing a call control in a mobile communication system including a first storage storing subscriber data for a home subscriber, a second storage storing call connection information and a third storage for storing subscriber data for a roaming subscriber, the determination means determines in response to a service request signal, that subscriber data is to be stored in the third storage and that there is no area therein for storing the subscriber data. Based on the determining by the determination means, the storing means retrieves the subscriber data from the first storage and stores the retrieved data in a second storage area. Also, the present invention provides the aforesaid determination means and overwrite means. Based on the determining by the determination means, the overwrite means retrieves the subscriber data from the first storage and overwrites the retrieved data in a third storage area.

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 3:
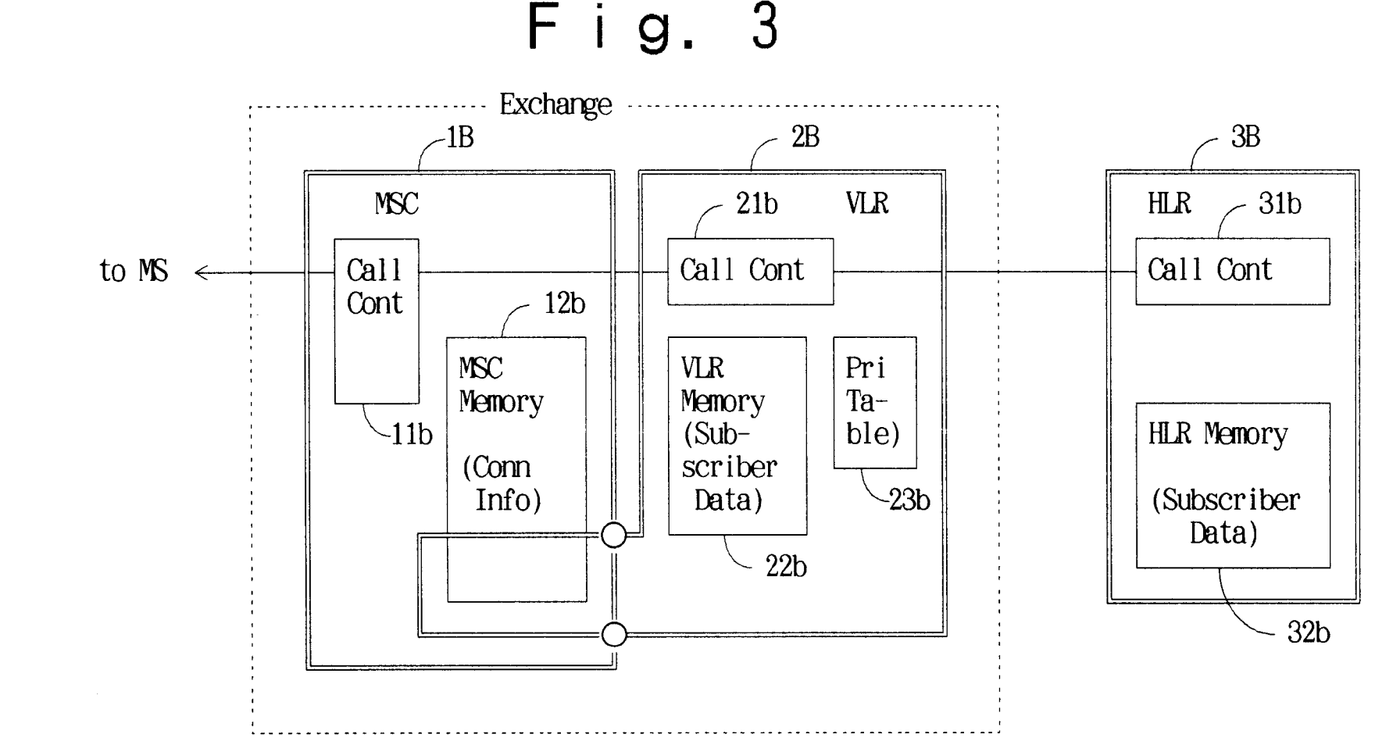
FIG. 3 is a block diagram illustrating the embodiment according to the present invention.

The call controlling device according to the present invention is explained in detail referring to figures. FIG. 3 is a block diagram illustrating the embodiment according to the present invention.

A mobile switching center (hereinafter abbreviated to MSC) 1B and a home location register (hereinafter abbreviated to HLR) 3B of the present invention has a construction and a function similar to those of the conventional MSC 1A and HLR 3A, respectively.

A visitor location register (hereinafter abbreviated to VLR) 2B of the present invention has a later-described function to access the MSC memory 12b and depending on examples, has a priority table (abbreviated to Pri Table in the figures) 23b, in addition to the function and construction of the conventional VLR 2A.

Figure 4:
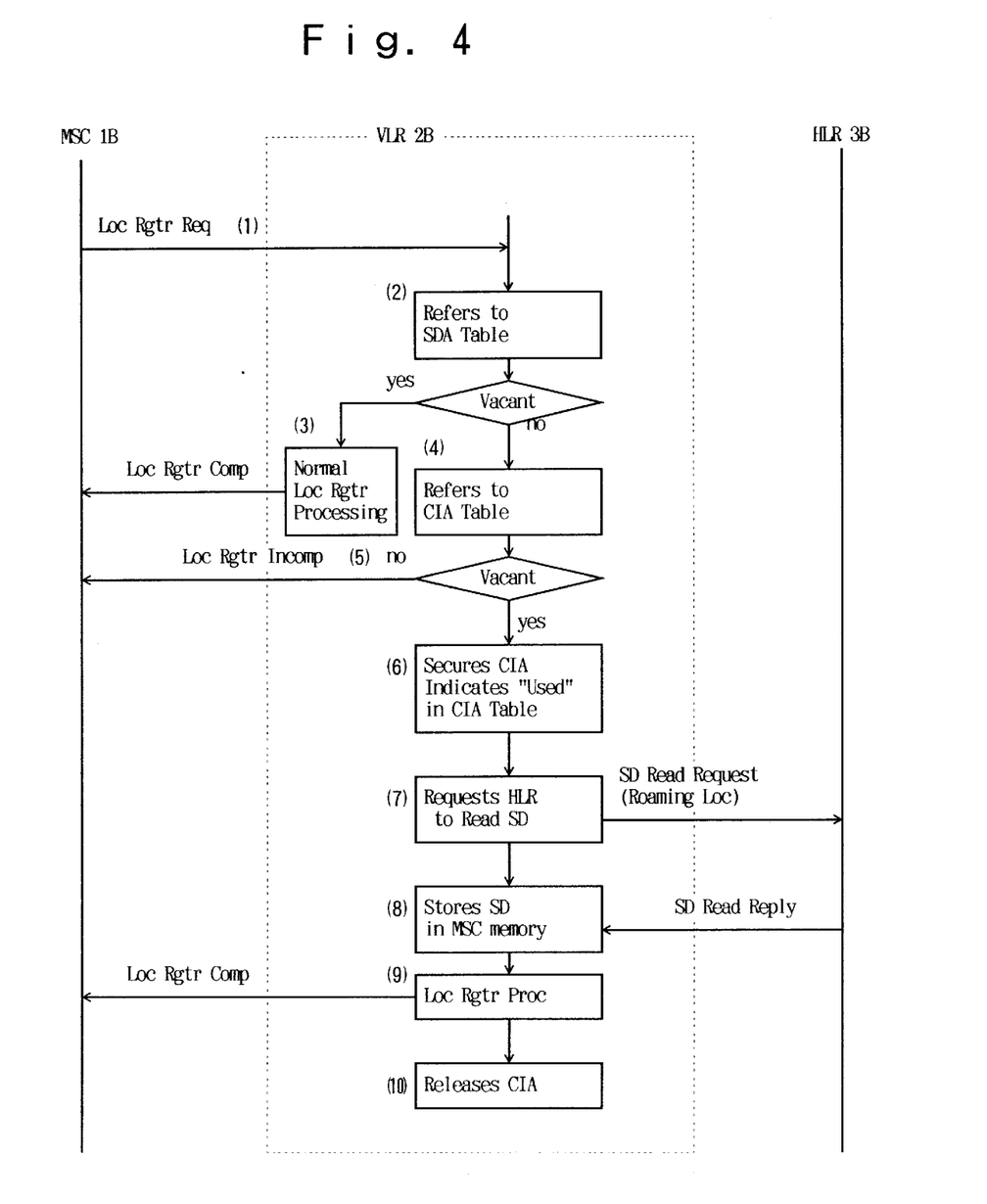
FIG. 4 is a flow chart illustrating the location registration operation according to the present invention.

FIG. 4 is a flow chart illustrating the location registration operation according to the present invention. The operation performed by the VLR 2B is explained based on FIG. 4, referring to FIG. 5 and FIG. 6.

Figure 5:
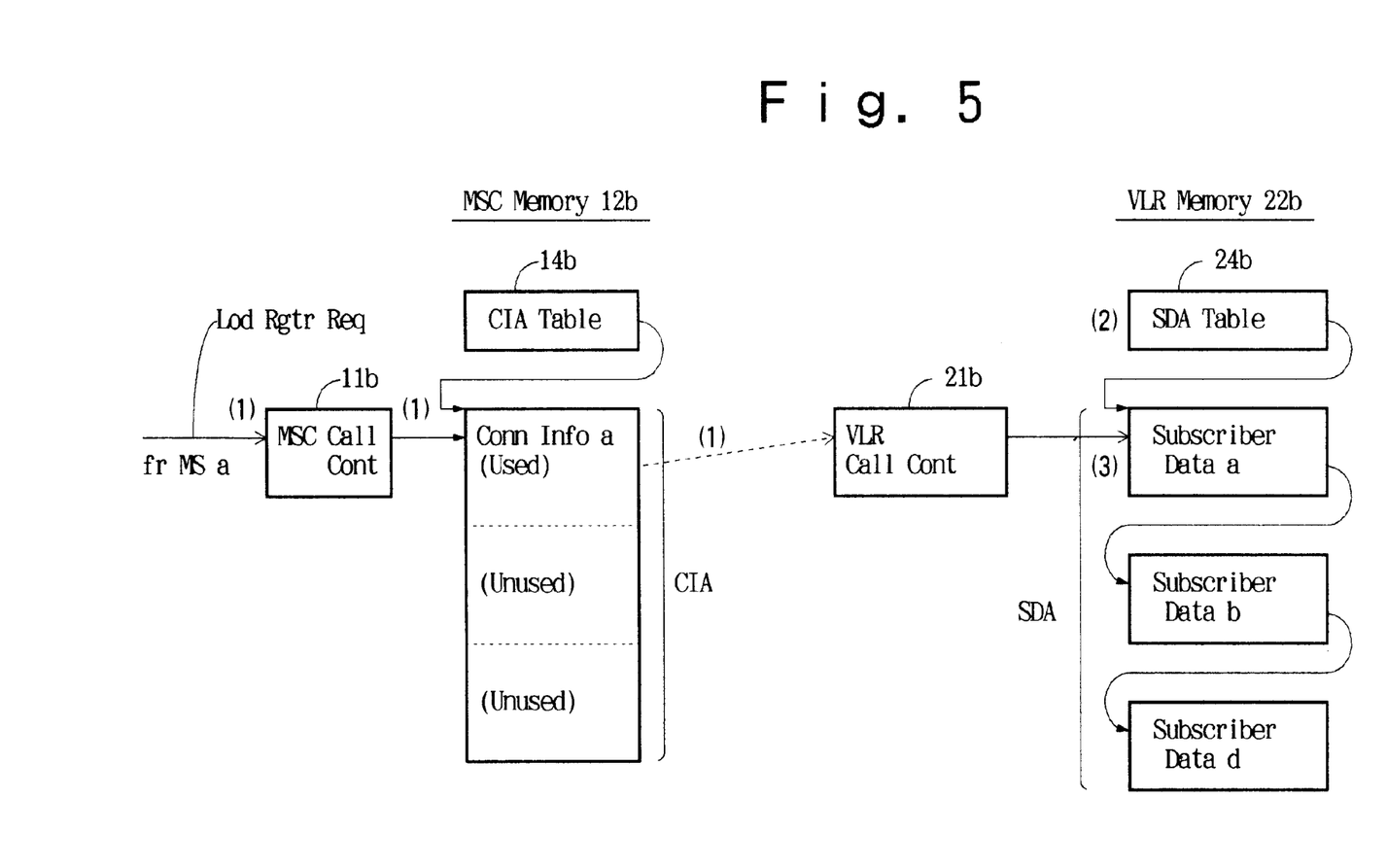
FIG. 5 illustrates a first example of memory use according to the present invention.
Figure 6:
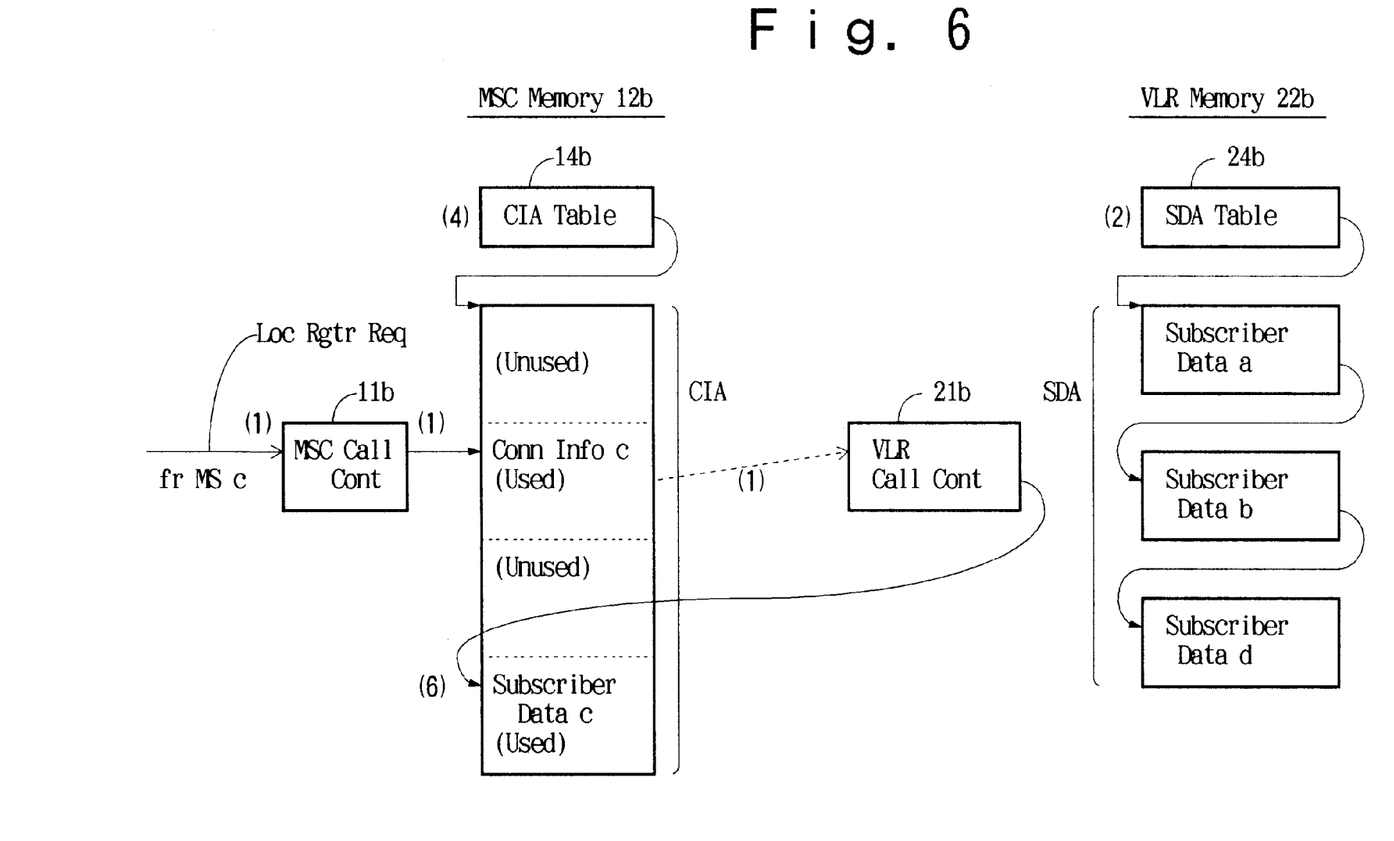
FIG. 6 illustrates a second example of memory use according to the present invention.

FIG. 5 illustrates a first example of memory use according to the present invention, which shows a normal case where the VLR memory 22b is vacant for storing the subscriber data. FIG. 6 illustrates a second example of memory use according to the present invention, which shows a case where the VLR memory 22b is full for storing the subscriber data.

(1) On receiving from a mobile station a or c (see FIG. 5 or 6) a location registration request signal including the call connection information and mobile station location, the MSC 1B obtains a call connection information area (abbreviated to CIA) in the MSC memory 12b and stores the received call connection information in the obtained area and makes a request to the VLR 2B (i.e., call controller 21b) for location registration (see FIGS. 5 and 6 step (1)).

(2) On receiving the location registration request signal, the VLR 2B checks a CIA table 24b whether a subscriber data area is present in the VLR memory 22b for storing subscriber data for a roaming subscriber (see FIGS. 5 and 6, step (2)). The CIA table 24b indicates an unused/used state of the subscriber data area (CIA) in the VLR memory 22b by a bit (e.g., value 0 or 1) corresponding, one for one, to a subscriber data area.

(3) If the CIA table 24b indicates "vacant", the VLR 2B obtains the corresponding subscriber data area (see FIG. 5, step (3)) and performs the normal location registration processing in the area, as shown by FIG. 2, steps (3) and (4). Then the VLR 2B informs the MSC 1B of completion of the location registration.

(4) If "full" is detected in above step (2), the VLR 2B attempts to obtain an area for temporarily storing the subscriber data, in the call connection information area of the MSC memory 12b (see FIG. 6, step (4)), by checking a CIA table 14b if the call connection information area is available.

The CIA table 14b, in the same way as the SDA table 24b, indicates an unused/used state of the call connection information area in the MSC memory 12b by a bit (e.g., value 0 or 1) corresponding, one for one, to a call connection information area. It is assumed here, for easy understanding, that the subscriber data area of the VLR memory 22b and the call connection information area in MSC memory 12b are equal in construction, i.e., in the number of bytes (constituting the area and the way of accessing the area.

(5) If the attempt in above step (4) fails in obtaining the call connection information area, the VLR 2B informs the MSC 1B of incompletion of the location registration, indicating Call Disconnect.

(6) When the check in step (4) detects "vacant" (e.g., bit value 0) in the CIA table 14b, the VLR 2B obtains a call connection information area corresponding to the bit (see FIG. 6, step (6)). The address of the area is determined by the bit position in the table. Then, the VLR 2B sets the bit to 1 to indicate that the corresponding call connection information area is being used.

(7) The VLR 2B sends to the HLR 3B of the mobile station, a Subscriber Data Read Request message including the location into which the mobile station has roamed, in order to request the subscriber data of the mobile station. Thus, the HLR 3B can manage the roaming location of its member mobile station (i.e., home subscriber).

(8) The HLR 3B replies with the subscriber data of the mobile station via a Subscriber Data Read Reply message. The VLR 2B temporarily stores the replied subscriber data in the above-obtained call connection information area.

(9) Based on the replied subscriber data, the VLR 2B performs location registration processing for the mobile station and notifies the MSC 1B of completion of the location registration.

(10) After completing the location registration processing, the VLR 2B releases the call connection information area, i.e., abandons the subscriber data stored therein. Then, the VLR 2B resets the CIA table bit corresponding to the released area to 0, to indicate that the area is unused.

Thus, according to the location registration of the present invention, even when there is no vacant area in the VLR memory 22b, the HLR 3B of a first mobile communication network can manage the location within a second network, into which its member mobile station (i.e., home subscriber) has roamed, since the HLR 3B performs the location registration by temporarily using the MSC memory 12b.

Therefore, even when a call incoming request addressed to a member mobile station of the first network is received from a third network, the first network can easily exchange the call to the second network, into which the member mobile station has roamed.

Figure 7:
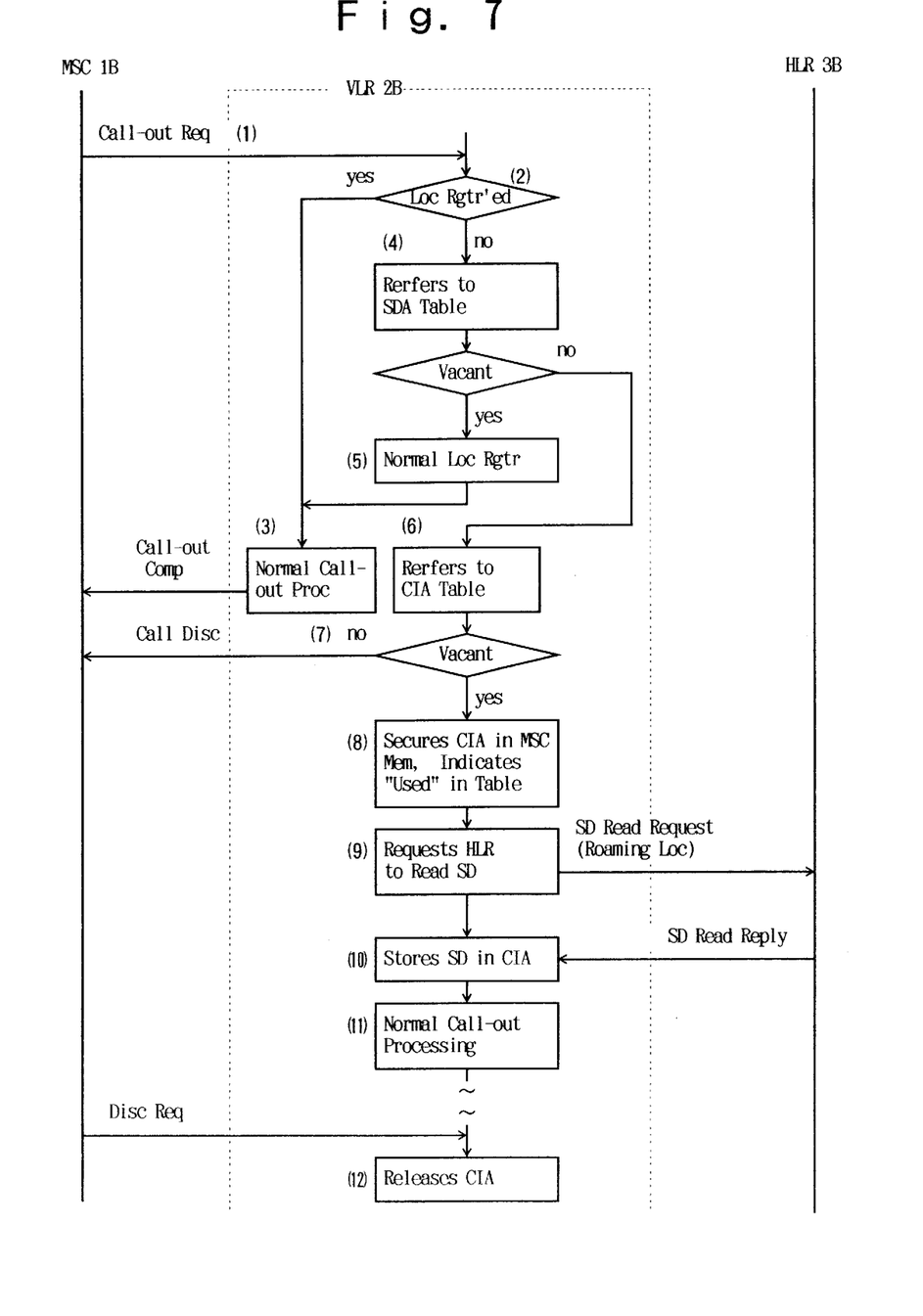
FIG. 7 is a flowchart illustrating a call originating operation according to the present invention.

FIG. 7 is a flowchart illustrating a call originating operation according to the present invention.

(1) When receiving a call originating request signal including call connection information and mobile station location, from (or when sending a call incoming request signal to) mobile station a, the MSC 1B obtains a call connection information area in the MSC memory 12b, stores the received call connection information in the area and then sends the call originating (or incoming) request signal to the VLR 2B.

(2) On recognizing the call originating request signal, the VLR 2B checks to see if the location of the mobile station has already been registered.

(3) When registered, the VLR 2B executes the normal call origination processing and thereafter notifies the MSC 1B of completion of the processing. According to the notification, the MSC 1B connects the call to the called mobile station.

(4) When the location has not been registered, the VLR 2B checks the subscriber data area (SDA) table 24b whether there is an unused subscriber data area.

(5) When there is an unused area, the VLR 2B registers the location in the area (see FIG. 4, step (3)) and thereafter, executes the call origination processing in accordance with the above step (3).

(6) When there is no unused -area found in above step (4), the VLR 2B checks the CIA table 14b if there is an unused call connection information area (CIA) in the MSC memory 12b.

(7) When there is no unused area found, the VLR 2B indicates the MSC 1B to disconnect the call.

(8) When there is an unused area found, the VLR 2B obtains the area corresponding to the bit (value 0) of the CIA table 14b and sets the bit to 1 to indicate that the area is being used.

(9) The VLR 2B sends to the HLR 3B of the mobile station, the Subscriber Data Read Request message including the roaming location to which the mobile station has roamed, to request the subscriber data of the mobile station. Thus, the HLR 3B can manage the roaming location of its member mobile station (i.e., home subscriber).

(10) The HLR 3B replies with the subscriber data of the mobile station via a Subscriber Data Read Reply message. The VLR 2B temporarily stores the replied subscriber data in the above-obtained call connection information area.

(11) Based on the subscriber data, the VLR 2B executes the known call origination processing and thereby the MSC 1B establishes a connection to the called subscriber to allow communication.

(12) When a Disconnect Request signal is received from the mobile station via the MSC 1B indicating that the communication has ended, the VLR 2B releases the above-obtained call connection information area (i.e. abandons the subscriber data stored therein). Then, the VLR 2B resets the CIA table bit corresponding to the released area to 0, to indicate that the area is unused.

Thus, since the present invention executes the location registration by temporarily using the MSC memory 12b, the call origination operation can be executed even when there is no area available in the VLR memory 22b for storing the subscriber data.

Further even when a call incoming request signal is received from a third network, the HLR 3B of a first network can easily exchange the requested call to a second network into which first network's member mobile station (or home subscriber) has roamed, by managing the location of a roaming member mobile station in the same way as in the above-explained location registration.

Figure 8:
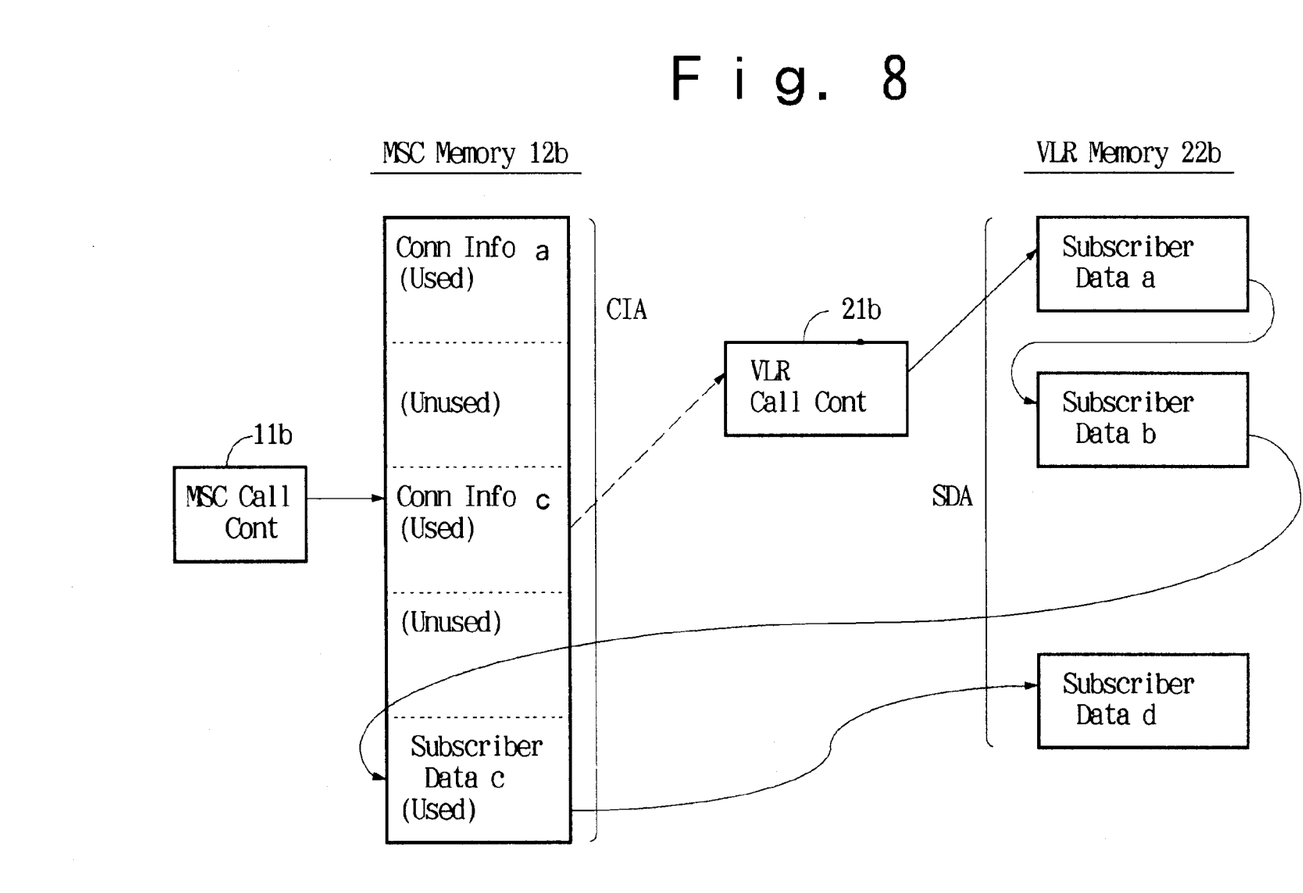
FIG. 8 shows a third example of memory use according to the present invention.

FIG. 8 shows a third example of memory use according to the present invention. It does not release the call connection information area where the subscriber data was stored via the operation of FIGS. 4 and 6, that is, it does not abandon but holds the subscriber data. The example is explained based on FIG. 8 referring to FIG. 4.

In the operation shown in FIG. 4, after the subscriber data was stored in the call connection information area in step (8) and the location registration processing was executed in step (9), the area was released in step (10)

The third example does not abandon but holds the stored subscriber data in the call connection information area to allow the subscriber data to be used for later-occurring call-originating and call-incoming processing. To attain the above, the memory system is constructed such that subscriber data c stored in the call connection information area resides virtually in the VLR memory 22b and chained from/to respective subscriber data b/d, both residing in the VLR memory 22b.

Figure 9:
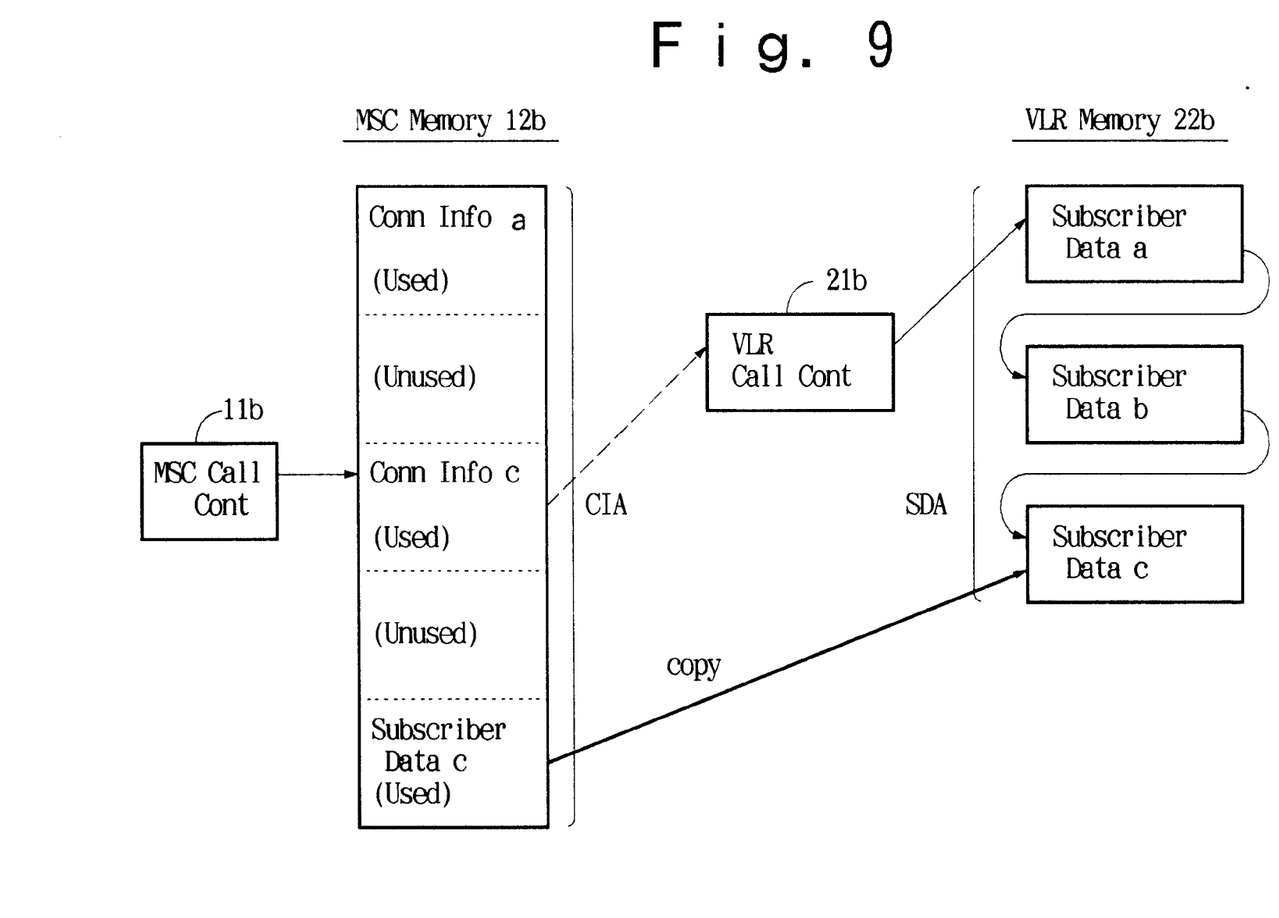
FIG. 9 illustrates a fourth example of memory use according to the present invention.

FIG. 9 illustrates a fourth example of memory use according to the present invention. It transfers to the VLR memory 22b afterward, the subscriber data held in the call connection information area in the aforesaid third example. The example is explained based on FIG. 9.

If it is recognized later when accessed by the MSC 1B or through periodic monitoring, for example that the subscriber data is held in the call connection information area, as in the condition resulting from the operation of FIG. 8, the VLR 2B checks the SDA table 24b for an unused subscriber data area and obtains same, if any.

The VLR 2B restores the subscriber data held in the call connection information area to the above-obtained subscriber data area and thereafter, releases the call connection information area.

Figure 10:
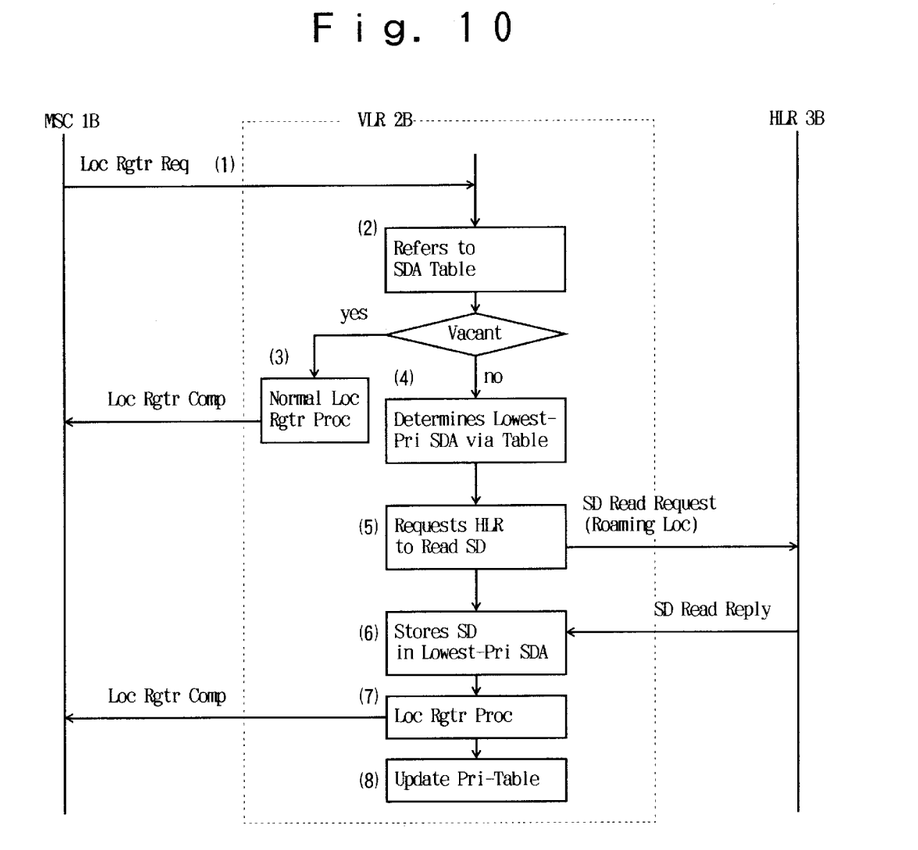
FIG. 10 is a flowchart illustrating a fifth example of memory use according to the present invention.

FIG. 10 is a flowchart illustrating a fifth example of memory use according to the present invention. If there is no unused subscriber data area in the VLR memory 22b for storing new subscriber data in response to e.g., a location registration request signal, the example replaces the existing subscriber data with the new one.

(1) At a request for location registration for example, from a mobile station, the MSC 1B sends a location registration request signal to the VLR 2B.

(2) On receiving the request signal, the VLR 2B checks the SDA table 24b if there is an unused subscriber data area in the VLR memory 22b (see FIGS. 5 and 6, step (2)). The SDA table 24b indicates a used/unused state of the subscriber data area in the VLR memory 22b by a bit (e.g., value 0 or 1) corresponding, one for one, to a subscriber data area.

(3) When detecting "unused", the VLR 2B obtains the corresponding subscriber data area, performs the aforesaid normal location registration processing and notifies the MSC 1B of completion of the location registration.

(4) When not detecting "unused" in the above step (2), i.e., failing to obtain a subscriber data area, the VLR 2B obtains the area stored with the subscriber data registered in a priority table 23b (see FIG. 11) as the lowest (see FIGS. 12A, 12B and 13A–13C).

(5) The VLR 2B sends a Subscriber data Read Request message to the HLR 3B of the mobile station to request its subscriber data.

(6) The HLR 3B replies with the subscriber data of the mobile station via the Subscriber Data Read Reply message. The VLR 2B registers the replied subscriber data, in an overwrite fashion, in the subscriber data area obtained in the above step (4), that is, replaces the lowest-priority subscriber data with the one replied by the HLR 3B.

(7) The VLR 2B performs the normal location registration processing based on this subscriber data and notifies the MSC 1B of completion of the location registration.

(8) The VLR 2B determines the priority of the above-registered subscriber data to register the priority in the priority table 23b. If the priority is to be determined based on the date when the subscriber data was registered, the subscriber data is registered as the highest priority.

Figure 11:
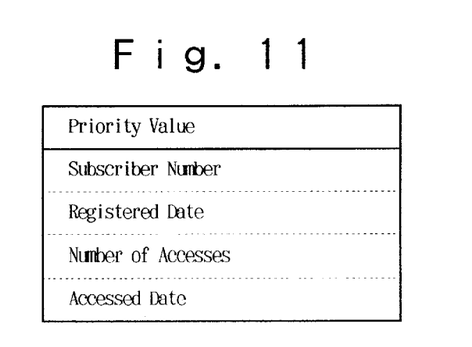
FIG. 11 shows a configuration of the priority table according to the present invention.

FIG. 11 shows a configuration of the priority table according to the present invention.

Specified in the priority table are elements by which the priority is decided, including the subscriber number, date when subscriber data was registered, frequency at which the subscriber data was referred to (or accessed) within a predetermined period and date when the data was accessed last. The priority is decided based on a value calculated by a selected one of the elements or a combination of those with a weight added as required.

Figure 12A:
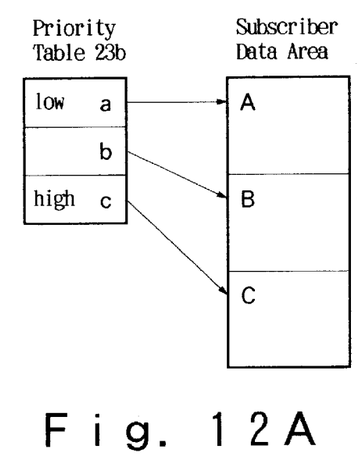
FIGS. 12A and 12B illustrate a fifth example of memory use according to the present invention.
Figure 12B:
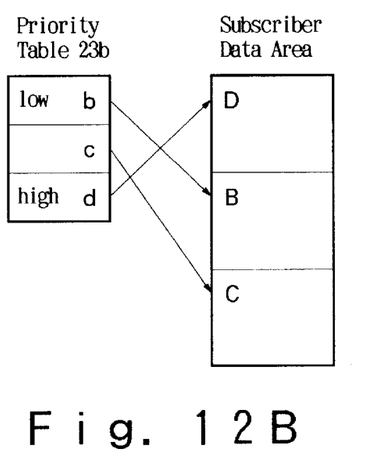

FIGS. 12A and 12B illustrate a fifth example of memory use according to the present invention, in which the VLR memory 22b has three subscriber data areas, for easy understanding. Subscriber data A, B and C are each registered in subscriber data area of the VLR memory 22b for subscribers a, b and c.

In the priority table 23b, subscriber numbers a, b and c are shown as priority information and arranged in an ascending order of priority from top to bottom according to the priority. For easy understanding, the correspondence between priority information of the priority table 23b and the subscriber data area is shown by the arrows.

When a new location registration request signal is received from a subscriber d in this state, one of the subscriber data is replaced with new one, as shown in FIG. 12B. That is, subscriber data D of the subscriber d is written in an overwrite fashion, on the lowest-priority data A of subscriber a. In other words, subscriber data A is purged and subscriber data D is ranked highest in the priority table 23b.

Figure 13A:
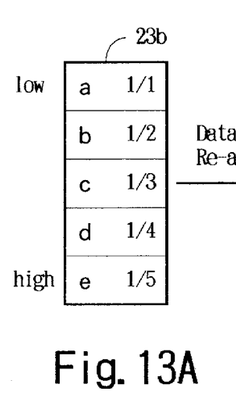
FIGS. 13A–13C show a transition of the priority of the subscriber data in the priority table.
Figure 13B:
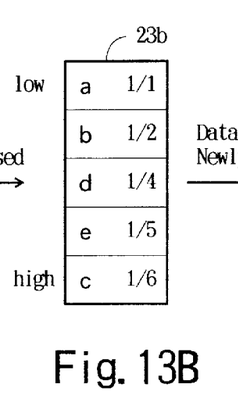
Figure 13C:
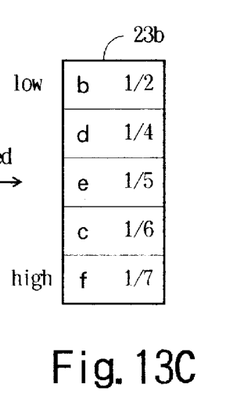

FIGS. 13A–13C show a transition of the priority of the subscriber data in the priority table, in which the priority is decided according to the latest access date.

In FIG. 13A, the priority information of subscribers a–e is arranged in the priority table 23b according to the month-date when the data was accessed last. That is, the subscriber data of subscriber e, which was accessed most recently (January 5), is registered as the highest and that of subscriber a, which was accessed most previously (January 1), is registered as the lowest.

FIG. 13B shows the resulting priority table 23b when, in the state shown in FIG. 13A, the already-registered subscriber data of subscriber c is accessed on January 7. That is, subscribers d and e who were higher in priority than subscriber c are each lowered by one level and instead, subscriber c is ranked highest.

FIG. 13C shows a state when the subscriber data of subscriber f was accessed newly on January 6 in the state shown in FIG. 13B. That is, subscriber f is ranked highest and therefore, subscribers b–e are each lowered by one, and priority information of subscriber a is deleted from table 23b and subscriber d is ranked highest. As for the subscriber data area (not shown in the figure), the subscriber data of subscriber a is purged and instead, that of subscriber f is registered in the area. That is, the subscriber data of subscriber d is written on that of subscriber a, which was ranked lowest in priority.

Figure 14:
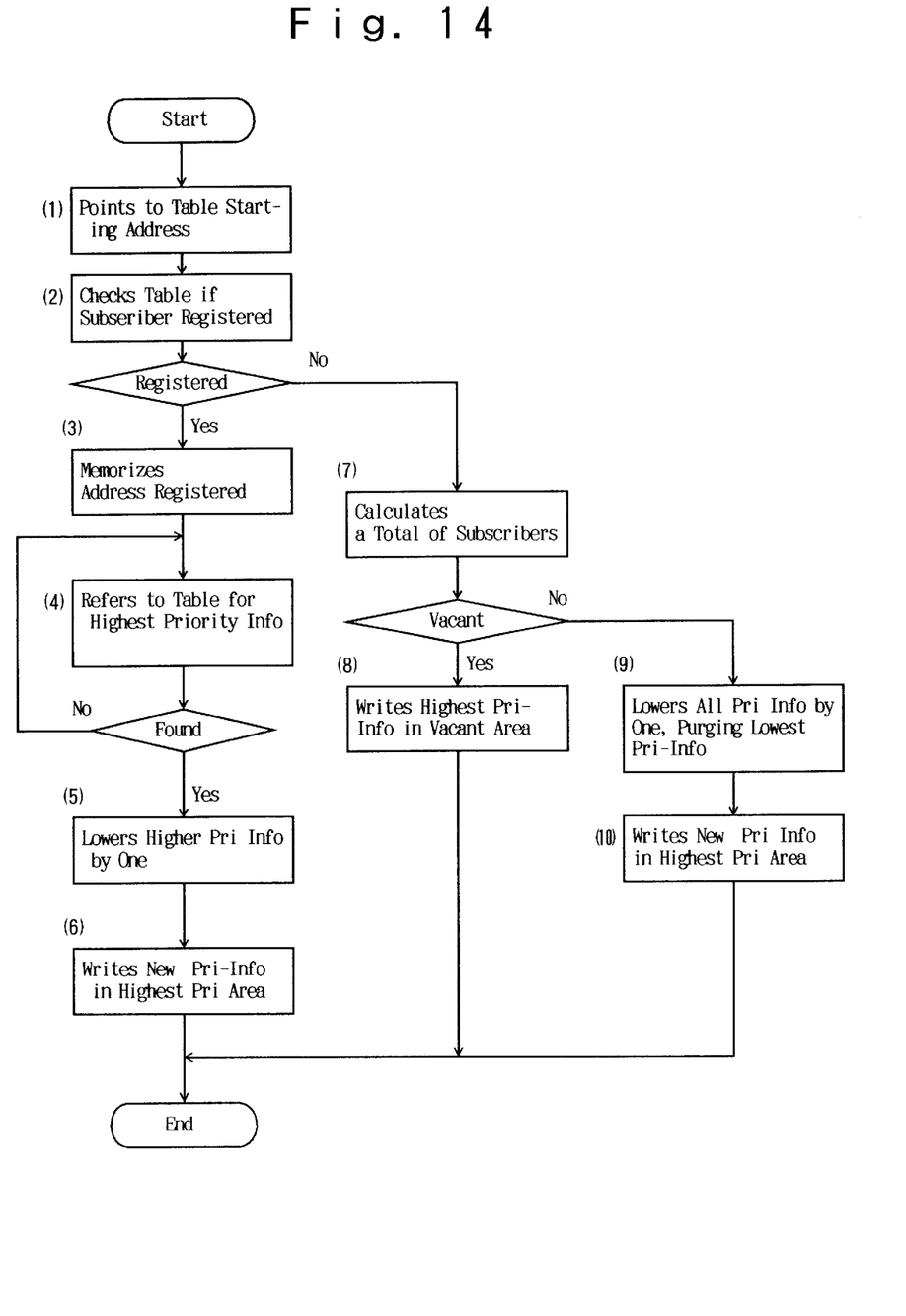
FIG. 14 is a flowchart illustrating a priority table registration operation according to the present invention.

FIG. 14 is a flowchart illustrating a priority table registration operation according to the present invention. It shows an operation of VLR 2B in an example in which the priority is decided according to the access date as in FIGS. 13A–13C.

(1) When to register the subscriber data in the VLR memory 22b at a request of MSC 1B for location registration for example, the VLR 2B first specifies the top address of the priority table 23b.

(2) The VLR 2B checks the priority table 23b, starting with the top address, whether the subscriber concerned is registered.

(3) If registered, the VLR 2B memorizes address k within the table 23b where the priority information of the subscriber is stored.

(4) The VLR 2B searches the priority table 23b for the priority information of the highest, starting with the address k in an ascending order of priority.

(5) When detecting the priority information of the highest (assumed to be stored at address h), the VLR 2B lowers the whole priority information stored at addresses (k+1) to h by one.

(6) The VLR 2B registers the new or updated priority information of the subscriber concerned, in the area evacuated as a result of the lowering (i.e., highest-priority area).

(7) Unless registered as a result of the checking in above step (2), the VLR 2B calculates the total of the subscribers registered in the priority table 23b and based on the total, determines if there remains an unused area.

(8) If there is an unused area, the VLR 2B registers the new priority information of the subscriber at the highest-priority position of table 23b.

(9) If there is no unused area, the VLR 2B lowers all the priority information by one in priority, thus purging the information of the lowest priority.

(10) The VLR 2B registers the new priority information of the subscriber at the highest-priority position of table 23b.

As explained above, the present invention is constructed such that if the VLR memory lacks in storage capacity for offering services requested by a mobile station, the MSC memory area is temporarily substituted for the VLR memory. Therefore, even when a system runs short of the VLR memory storage capacity due to a communication traffic congestion or because of small storage capacity provided in the system, for example, the system according to the present invention need not refuse such requests and accordingly, can offer an optimum service.

Further, since the HLR is informed of the mobile station's roaming location even in the second example of memory use in which the temporarily used MSC memory area is released afterward, the HLR can meet a later-generated call incoming request signal quickly and effectively.

Still further, since the present invention meets a newly generated service request by replacing the subscriber data of low priority with new one when the VLR memory lacks in capacity, it can offer an optimum service without rejecting the service request.

What is claimed is:

1. An apparatus for performing a call control in a mobile communication system including a first storage storing subscriber data for a home subscriber, a second storage for storing call connection information and a third storage for storing subscriber data for a roaming subscriber, said apparatus comprising:

determination means responsive to a service request signal, for determining that subscriber data is to be stored in the third storage and that there is no area therein for storing the subscriber data; and storing means, based on the determining by said determination means, for retrieving the subscriber data from the first storage and storing the retrieved data in the second storage area.

2. The apparatus according to claim 1, wherein the second storage and the third storage are contained in one single equipment.

3. The apparatus according to claim 1, wherein the first storage, second storage and third storage are provided in a home location register, a mobile switching center and a visitor location register, respectively.

4. The apparatus according to claim 1, wherein the subscriber data stored in the second storage area by said storing means is restored to the third storage area afterward.

5. The apparatus according to claim 4, wherein the subscriber data is restored when the data is referred to again or detected by monitoring.

6. The apparatus according to claim 1, wherein the second storage area in which the subscriber data was stored by said storing means is released after the service request signal has been processed.

7. The apparatus according to claim 1, wherein said determination means comprises first table means for storing information indicating whether a third storage area is available for storing the subscriber data; and wherein said determination means makes the determination based on said first table means.

8. The apparatus according to claim 1, wherein storing means comprises second table means for storing information indicating whether a second storage area is available for storing the subscriber data; and wherein said storing means stores the data based on said second table means.

9. An apparatus for performing a call control in a mobile communication system including a first storage storing subscriber data for a home subscriber, a second storage for storing call connection information and a third storage for storing subscriber data for a roaming subscriber, said apparatus comprising:

determination means responsive to a service request signal including a request for location registration, call originating and call incoming from/to a roaming subscriber, for determining that subscriber data is to be stored in the third storage and that there is no area therein for storing the subscriber data; and overwrite means, based on the determining by said determination means, for retrieving the subscriber data from the first storage and storing the retrieved data in a third storage area by overwriting the currently stored subscriber data.

10. The apparatus according to claim 9, wherein said overwrite means comprises second table means for indicating a priority of the subscriber data stored in the third storage; and wherein said overwrite means, based on said second table means, overwrites the data in the area where the subscriber data of the lowest priority is stored.

11. The apparatus according to claim 10, wherein said second table means decides the priority by any of elements including a subscriber number, date when the subscriber data was stored in third storage, frequency at which the data in the third storage was referred to and date when the data was referred to last or by a combination of the elements.

12. The apparatus according to claim 9, wherein said determination means comprises first table means for storing information indicating whether a third storage area is available for storing the subscriber data; and wherein said determination means makes the determination based on said first table means.

13. The apparatus according to claim 9, wherein said overwrite means stores the retrieved data in a third storage area by overwriting another subscriber's currently stored subscriber data.

14. The apparatus according to claim 9, wherein the first storage, second storage and third storage are provided in a home location register, a mobile switching center and visitor location register, respectively.

15. A method for performing a call control in a mobile communication system including a first storage storing subscriber data for a home subscriber, a second storage for storing call connection information and a third storage for storing subscriber data for a roaming subscriber, said method comprising the steps of:

(a) determining in response to a service request signal, that subscriber data is to be stored in the third storage and that there is no area therein for storing the subscriber data; and (b) based on said determining in step (a), retrieving.the subscriber data from the first storage and storing the retrieved data in a second storage area.

16. A method for performing a call control in a mobile communication system including a first storage storing subscriber data for a home subscriber, a second storage for storing call connection information and a third storage for storing subscriber data for a roaming subscriber, said method comprising the steps of:

(a) determining in response to a service request signal including a request for location registration, call originating and call incoming from/to a roaming subscriber, that subscriber data is to be stored in the third storage and that there is no area in the third storage for storing the subscriber data; and (b) based on said determining in step (a), retrieving the subscriber data from the first storage and storing the retrieved data in a third storage area by overwriting the currently stored subscriber data.

* * * * *

UNITED STATES PATENT AND TRADEMARK OFFICE
CERTIFICATE OF CORRECTION

PATENT NO.      : 6,597,909 B1
DATED           : July 22, 2003
INVENTOR(S)     : H. Takubo et al.

It is certified that error appears in the above-identified patent and that said Letters Patent is hereby corrected as shown below:

<u>Title page,</u>
Item [73], Assignee, please correct the Assignee to read:
-- Fujitsu Limited, Kawasaki (JP) --

Signed and Sealed this

Second Day of December, 2003

JAMES E. ROGAN
*Director of the United States Patent and Trademark Office*